Sept. 22, 1936.    A. A. LANE    2,055,297
HYDRAULIC BRAKE
Filed Sept. 18, 1934    3 Sheets-Sheet 1
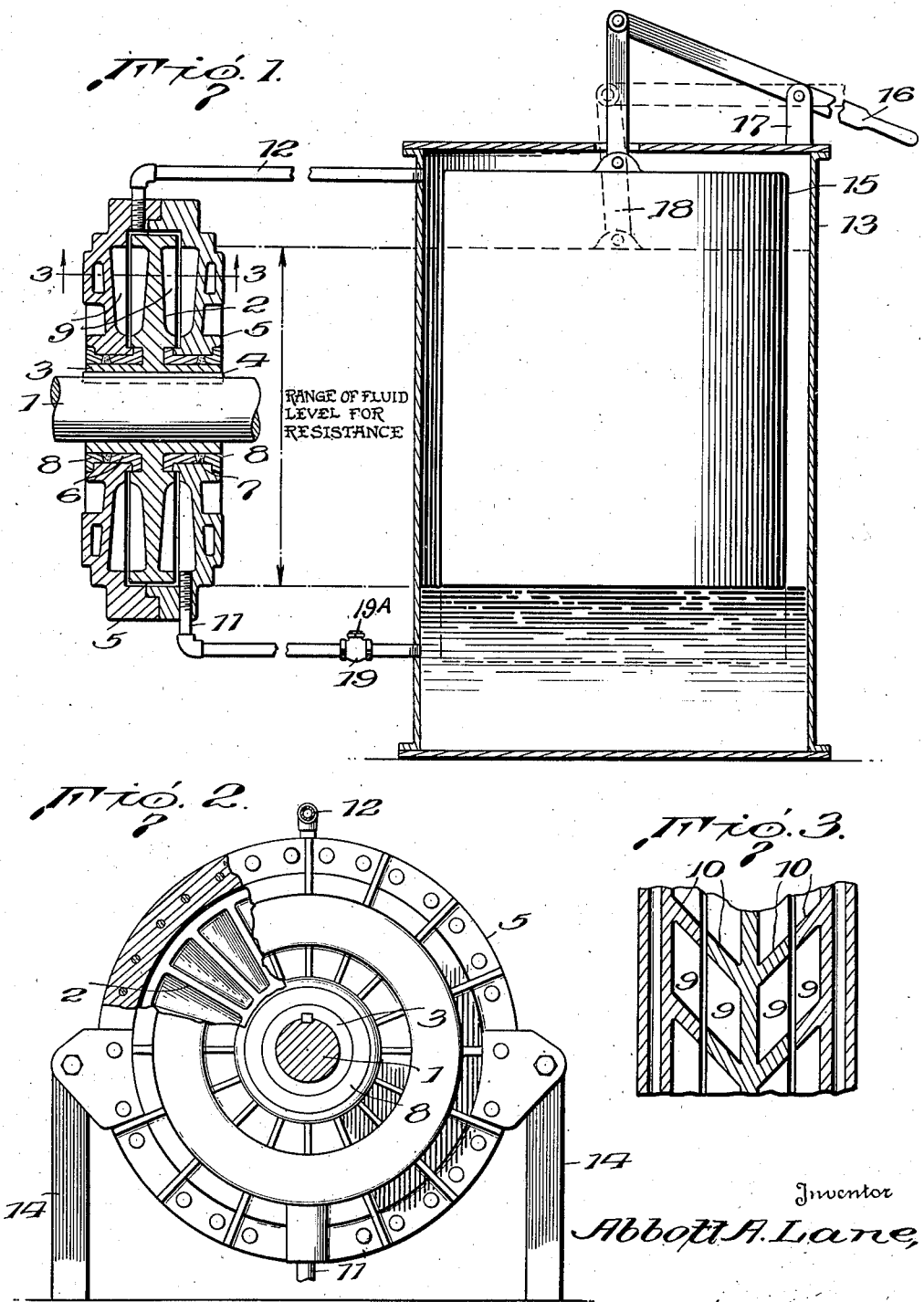
Inventor
Abbott A. Lane,
By A. M. Houghton
his Attorney

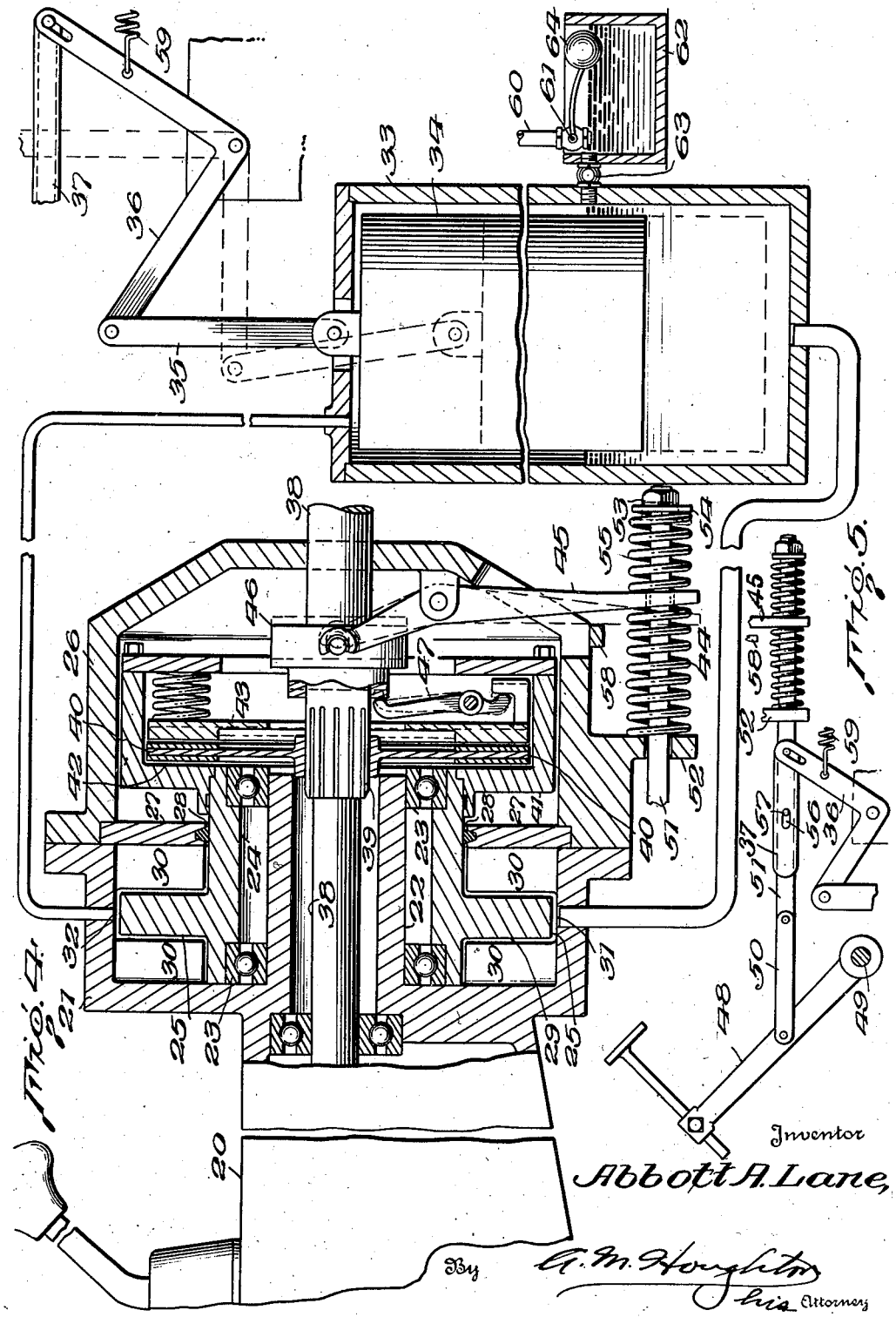

Sept. 22, 1936.   A. A. LANE   2,055,297
HYDRAULIC BRAKE
Filed Sept. 18, 1934   3 Sheets-Sheet 3
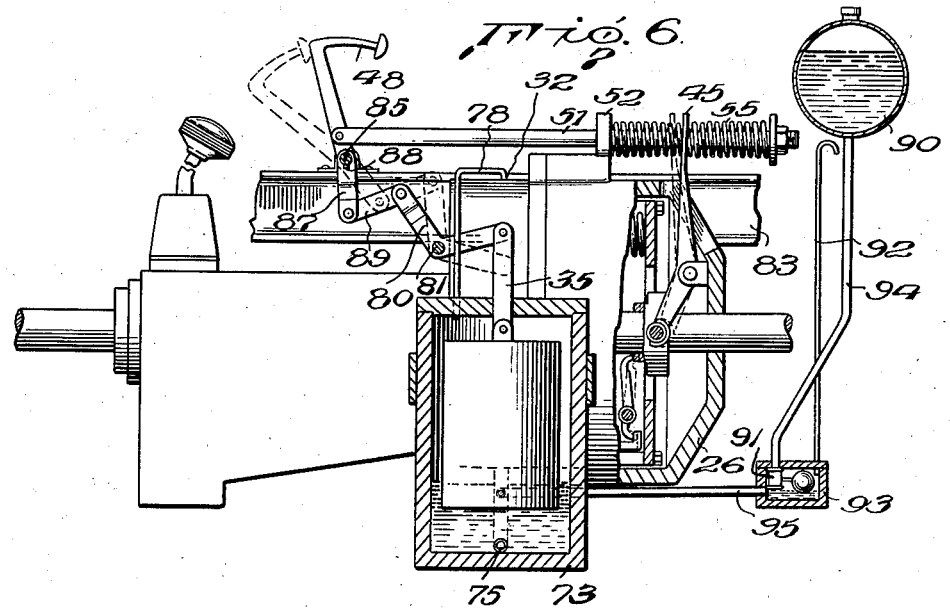
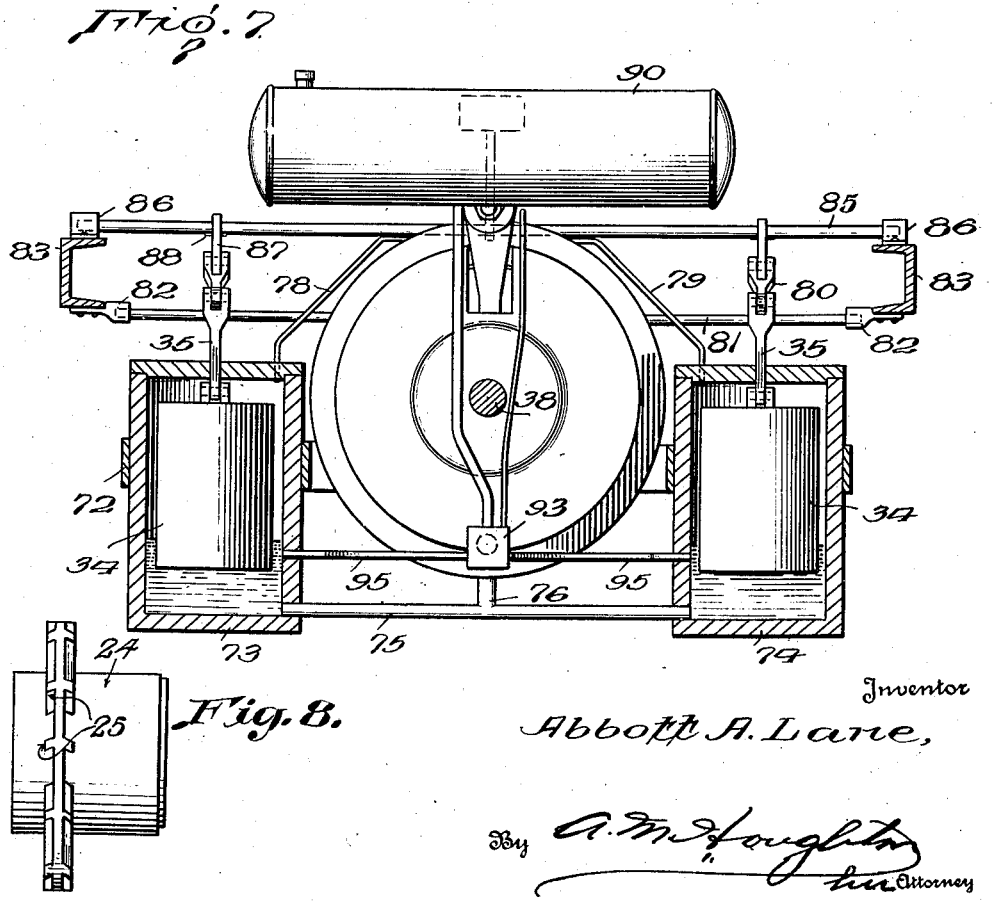
Inventor
Abbott A. Lane, Patented Sept. 22, 1936

2,055,297

UNITED STATES PATENT OFFICE 2,055,297

HYDRAULIC BRAKE

Abbott A. Lane, O'Hara Township, Allegheny County, Pa., assignor to Gulf Research & Development Company, Pittsburgh, Pa., a corporation of Delaware Application September 18, 1934, Serial No. 744,575

10 Claims. (Cl. 188—90)

This invention relates to hydraulic brakes and more particularly to improvements in that class of fluid-friction brakes wherein a rotor, actuated by the element to be braked, rotates within a stator, the stator forming a liquid holding chamber around the rotor and the rotor acting to circulate liquid through said chamber and through a liquid reservoir and wherein the braking resistance is determined by the head of fluid acting on the brake inlet; and it comprises in such a brake means for introducing liquid from the reservoir to the chamber when the brake is applied and for quickly draining the chamber of liquid when the brake is released; it further comprises in combination with such means a clutch acting between the rotor and the element to be braked; and it further comprises means for engaging the clutch before introducing liquid to the chamber when applying the brake and for draining the chamber of liquid before disengaging the clutch when releasing the brake; all as more fully hereinafter set forth and as claimed.

Heretofore brakes of the general class described herein have been mostly used as dynamometers for laboratory testing and breaking in of engines. Recently, however, through some modification, this type of brake has been used to relieve mechanical friction brakes from heavy duty on the sand reels and bull wheels of drilling rigs and the like.

Testing laboratories are usually plentifully supplied with water and in laboratory installations of this type of apparatus the head of water applied to the brake is usually controlled by a valve in the water supply line; the discharge from the brake being customarily led to the sewer. However, this large wastage of water is not practical for oil field applications or other installations where the supply of water is limited. In the more recent oil field applications brakes of this type have been installed with a water supply tank of relatively large capacity in communication with the brake through connections from the bottom of the supply tank to the brake inlet and connections from the brake outlet to a standpipe projecting from the top of the tank. In such installations the top of the tank is set level with the bottom of the brake casing and completely filled with water, while the head of water acting on the brake is determined by the level of the water in the standpipe. As the resistance to rotation produced by the brake is directly proportional to the head of water acting on the inlet at any given speed of rotation, it is expedient to provide means for varying the level of water in the standpipe to afford control of the resistance produced by the brake. This has been accomplished by providing a 3-way valve connected respectively to the water supply line, to waste and to a drain in the brake casing fixed at such a level as to drain the casing completely. With this valve the operator can, at will, feed a relatively small amount of water into the closed circuit and cause the level of water in the standpipe to be raised with the result that the resistance of the brake is raised at any given speed. When a load is being hoisted, the rotor will be revolved in a direction opposite to that occurring in the braking operation, and while this rotation causes less resistance from the liquid, owing to the shape of the rotor and casing elements, nevertheless it is desirable to drain the casing completely of water in order to completely eliminate fluid friction. To do this, the operator may position the 3-way valve so as to connect the drain from the casing with the waste outlet, the liquid wasted amounting in some instances to about 12 gallons.

The installation just described while having many advantages over the usual mechanical friction brakes is nevertheless limited by certain objectionable features. One disadvantage is that in order to increase the static head operating on the brake inlet, water must be led into the system through a relatively small pipe under existing pressure, with the result that such an operation is slower than desirable. Likewise, to decrease the head the system must be drained by gravity which not only takes more time than is desirable but results in a waste of water.

The dynamometer type of brake has not previously been found applicable to high speed work such as braking of automobiles, high speed hoists, etc., because of the disadvantage that at high speeds when the brake is not applied and it is desirable that there be no resistance to rotation, the rotor of such a brake causes considerable resistance by dragging through air. Such resistance requires an increased expenditure of power which is costly and unpractical.

In addition, the dynamometer type of brake has not previously been applicable to automobiles or other vehicles because of the large wastage of liquid required for intermittent operation and consequent need for unlimited supply.

Among the objects of the present invention is the provision of a water reservoir in connection with the type of brake described with means cooperating with the system so that the head of liquid operating on the brake inlet may be raised or lowered more rapidly than has been heretofore possible.

Another object is the provision of means whereby lowering of the head may be accomplished without loss of water from the system.

A further object is the provision of means whereby in high speed work the rotor of the brake may be disengaged from the element to be braked when the brake is not applied.

In the present invention these and other objects are attained by the provision of a large water reservoir or tank; the lower portion of which communicates with the inlet of the brake and the upper portion of which communicates with the brake outlet. The reservoir is provided in its interior with a movable displacement body which may be raised or lowered within the reservoir and the reservoir is so disposed with respect to the brake that when the displacement body is raised to its uppermost position the level of the water in the reservoir is below the level of the inlet to the casing of the brake. By lowering the displacement body within the reservoir the water is displaced and consequently rises around the displacement body causing the static head on the brake inlet to be raised. In operation, the water level, and hence the resistance, may be varied almost instantaneously between zero and maximum by lowering or raising the displacement body, and when a load is being hoisted (as for instance in the application of my device to drilling rigs), and the rotor is revolving in an opposite direction to that when acting as a brake, the brake casing may be completely drained by raising the displacement body in the reservoir thereby permitting the water in the brake casing to run back into the tank, and providing an appreciable saving of water.

In application to high speed devices the brake is modified by the provision of a clutch of any suitable type acting between the brake rotor and the element to be braked so that when not in use the brake rotor may be disengaged and undesirable resistance overcome. Advantageously, means are provided for actuating the clutch and displacement body at predetermined intervals so that when the brake is applied the clutch first causes the rotor to rotate and then liquid is introduced into the casing to raise the braking resistance on the rotor. In releasing the brake the actions are reversed, the liquid first being drained from the casing and the clutch then being disengaged. When the brake is applied to automobiles the actuating means just described may well be a single pedal connected by a series of links to both the lever for moving the clutching element and the lever for moving the displacement body in such a manner that initial movement of the pedal will cause the clutch to engage, while movement of the displacement body is delayed until such engagement takes place after which further movement of the brake pedal causes the displacement body to displace liquid from the reservoir into the brake casing. When the pedal is released the actions are reversed.

In the accompanying drawings illustrating more or less diagrammatically two forms of a specific embodiment of my invention.

Fig. 1 is a sectional elevation of braking apparatus embodying my invention and showing the action of the displacement body in the water reservoir;

Fig. 2 is a front elevation, partly broken away, illustrating the method in which the brake casing is mounted on its support and the appearance of the brake rotor within the casing;

Fig. 3 is a section through the pockets along the line 3—3 of Fig. 1;

Fig. 4 is an elevation partly in section of a modified form of my invention wherein the brake is shown in its application to an automotive vehicle and a clutch is provided between the rotor and the element to be braked;

Fig. 5 is an elevation of an advantageous mechanism for actuating the clutch and displacement body shown in Fig. 4 at predetermined intervals according to my invention;

Fig. 6 is a side view partly in elevation, partly in vertical section of a modified form of the apparatus of Fig. 4, having two reservoirs;

Fig. 7 is a rear view partly in vertical section, partly in elevation, of the apparatus of Fig. 6; and Fig. 8 is a side elevation in reduced scale of the rotor shown in Fig. 4, illustrating more completely the configuration of the rotor blades.

Referring to the drawings, and particularly to Figs. 1-3, reference character 1 denotes a shaft of the element to be braked. Mounted on the shaft is a brake rotor 2, the hub 3 of which is slidably mounted on the shaft 1 and keyed thereto by key 4. A casing or stator 5 enclosing the rotor is supported on the hub 3 by bushings 6 of bronze or other suitable material. Stuffing 7 is held in place adjacent bushing 6 on the outside by glands 8 and serves to seal the brake from fluid leakage around the hub 3. On the sides of the rotor and stator are pockets 9 separated from each other by the partitions 10 which are in the form of vanes inclined so as to be opposed to the direction of rotation. Liquid is introduced into the brake through inlet 11 and flows into the pockets 9. Owing to the shape of the vanes 10 on the rotor and rotation of the latter, liquid is carried around the casing and discharges through pipe 12 which conveys it into a reservoir or tank 13. The stator or casing 5 of the brake is prevented from revolving by means of the bars 14, which also serve to support the brake. In operation, cool liquid from reservoir 13 is introduced through inlet 11 into casing 5 where it is acted on by the rotor and carried to the discharge pipe 12. During passage through the brake, the liquid becomes heated while dissipating energy and this heat is carried away by circulation of the liquid between the reservoir and the brake.

At any given speed of the rotor 2, the braking resistance is directly proportional to the flow of liquid into the brake and as the flow of liquid is controlled by the static head on the brake established by the level of the liquid in the reservoir, the resistance of the brake may be varied from substantially nothing to maximum by properly varying the level of liquid in the reservoir.

According to my invention, a movable displacement body 15 is disposed within the reservoir 13 in such a manner as to be readily and quickly raised or lowered; for example, by means of a lever 16 pivotally supported on a fulcrum 17 and connected to the displacement body through a pivoted link 18. Any suitable means (not shown) may be employed for fixing the lever in a desired position. The displacement body is so arranged with respect to the liquid in the reservoir that at its uppermost position, as shown in full lines in Fig. 1, the liquid level in the reservoir will be below that at which liquid is in contact with the rotor in the brake casing and at its lowermost position, as shown in dotted lines in Fig. 1, the liquid level in the tank will establish the maximum desired static head differential between this level and the inlet to the brake casing.

Enough clearance is provided between the displacement body 15 and the reservoir 13 to permit ready circulation of water between the pipe 12 and pipe 11.

Thus, I have provided means by which the resistance of the brake can be varied quickly and in predetermined amounts over a wide range.

In order to replenish liquid lost in evaporation, etc., there is provided in inlet line 11 a three-way union 19 having a fitting 19A to which a hose or pipe may be coupled. A one-way valve (not shown) in fitting 19A permits ingress of liquid to the inlet 11, but prevents escape of liquid from the system through the fitting 19A. Additional liquid is advantageously introduced through fitting 19A when the brake rotor is idle. The liquid may be supplied from any convenient source (not shown) under sufficient pressure to overcome the hydrostatic head at the fitting. In the event that it is desirable to provide automatic control of the correct liquid level in the reservoir 13 without continual adjustment by the operator, valve 19 may be replaced by a liquid controlled valve in the reservoir circuit connected to a separate supply of additional liquid such as a tank of higher elevation or a pressure main and arranged to supply additional liquid to the system when the level in the liquid reservoir reaches a predetermined minimum point with the liquid at its lowest level, which is always when the liquid is out of the brake with the displacement body raised. Such an arrangement is described elsewhere in this specification.

If the invention is to be applied to high speed work, it is desirable to employ a slightly modified form of brake which I have illustrated diagrammatically in Figs. 4 and 5 as applied to the propeller shaft of an automobile. Referring in particular to Figs. 4 and 5, reference character 20 indicates in general a transmission housing having an outer flanged cylindrical extension 21 and an inner hollow extension or spud 22 carrying ball bearings 23 upon which is mounted the hub of a brake rotor 24 having blades 25, of which two, diametrically opposed, appear (in section) in the showing. The configuration of the blades 25 and their relationship to the rotor hub 24 are clearly illustrated in the showing of Fig. 8. Bolted or otherwise secured to the flange of the housing extension 21 is a dish-shaped shell 26 forming with extension 21 a fixed casing for the brake rotor and clutch mechanism hereinafter described. A seal plate 27 carrying packing 28 forms with the extension 21 a liquid-holding chamber 29 in which the blades 25 rotate. Fixed stator blades 30 are integrally cast with, or otherwise attached to the extension 21 on either side of blades 25 within the liquid holding chamber 29 and cooperate with any liquid in the chamber to exert a braking action on the rotor 24. A liquid inlet 31 and outlet 32 are provided for the chamber 29 and communicate respectively with the lower and upper portion of a liquid reservoir 33 in which liquid normally reposes at a level below that of inlet 31 when the brake is not in use. Within the reservoir a movable displacement body 34 is disposed so as to be readily raised or lowered by means of link 35, bell crank 36 and sleeve 37. In operation the action of the brake rotor and stator, the reservoir and displacement body is the same as that previously described in connection with Figs. 1 to 3, inclusive. However, in the modification shown in Figs. 4 and 5, shaft 38, which is the element to be braked, is provided with a splined portion 39 on which is mounted the disc element 40 of a disc-type clutch, free to move axially of the shaft but fixed against rotation relative thereto. An annular member 41, secured to the hub of rotor 24, has a face 42 for engaging one side of disc 40. Opposed to member 41 on the opposite side of disc 40 is a member 41 spring-pressed clutching member 43 adapted to force the disc against face 42 and hold it there when the clutch is engaged thus causing the rotor 24 to be actuated by the shaft 38 through the disc 40 and member 41. The clutch shown is normally kept in the released position shown in full lines in Fig. 4 by means of a coil spring 44, stronger than the clutch springs, acting through pivoted lever 45, thrust collar 46 and a plurality of pivoted levers 47, only one of which shows in Fig. 4.

In operation, to engage the clutch, the lever 45 is moved against spring 44 to the position shown in dotted lines. The clutch springs then move clutching member 43 against the disc 40 causing levers 47 to throw the thrust collar outwardly against the end of lever 45.

In Fig. 5 I have illustrated means by which the brake clutch and displacement body may be actuated from the same pedal. A pedal 48, pivoted as at 49 is connected through a link 50 with a reciprocable rod 51 which passes through an abutment 52 and through the lever 45 terminating in a threaded portion carrying a nut 53 and washer 54. Coil spring 44 is placed around rod 51 between the abutment 52 and lever 45 while a coil spring 55 similar to 44 but less resilient is placed around rod 51 between the lever 45 and washer 54.

Sleeve 37 which operates the bell crank 36 and hence the displacement body 34 is slidable on the rod 51 and is provided with a slot 56 accommodating pin 57 on the rod. A stop 58 limits the movement of the lever 45. As illustrated in full lines the pedal is in its uppermost position, the clutch is disengaged and the displacement body in the reservoir is raised out of the liquid. To apply the brake the pedal 48 is depressed causing rod 51 to move to the left. As spring 55 is less resilient than spring 44, the initial movement of rod 51 causes the lower end of lever 45 to move toward the stop 58 while compressing spring 44. During this initial movement, the rod 51 and the pin 57 thereon slide freely relative to the sleeve 37 until the lever 45 engages the stop 58 at which time the pin 57 has traveled the length of the slot 56 and engages the sleeve 37. After lever 45 engages stop 58 further depression of pedal 48 causes rod 51 to compress spring 55 and to carry the sleeve 37 to the left, moving the bell crank 36 against a spring 59 and thereby lowering the displacement body 34 in the reservoir and causing liquid to enter inlet 31. The liquid entering the inlet causes resistance to rotation of the brake rotor and hence a braking action is exerted on the shaft 38.

The more the pedal is depressed, the more the liquid is raised in the reservoir and in consequence the higher the resistance imposed by the brake.

When the pedal is relieved of pressure the sequence of movement is reversed; the sleeve 37 and bell crank 36 moving back to their original position under the action of spring 59 thus raising the displacement body 34 out of the liquid in the reservoir 35 and causing the level to be lowered below the level of the brake inlet 31 whereby the chamber 29 in the brake is drained of liquid. The spring 55 has then expanded to its original state and further movement of the rod 51 releases the tension on lever 45 permitting spring 44 to return it to its original position in which the clutch is disengaged. In order to prevent the liquid in the reservoir from falling below a desired minimum level I provide a storage tank corresponding to tank 90 (see Fig. 6) at a higher level communicating with the reservoir 33 through a pipe 60, float valve 61, float chamber 62 and check valve 63. When the level in the reservoir 33 falls below the level in the float chamber 62, liquid flows from the float chamber to the reservoir causing float 64 to open valve 61 in pipe 60 and thus replenishing the liquid lost from the float chamber. Liquid is prevented from flowing back into float chamber 62 by the check valve 63.

No attempt having been made in the drawings to represent the relative parts in their true proportions or limit the respective positions which they may occupy, it is to be understood that the displacement body should be capable of raising the liquid in the reservoir to a level at which the maximum amount of liquid desirable is introduced to the liquid chamber 29 through inlet 31. Furthermore, in automotive or other applications in which the relative positions of the reservoir and the brake may vary with respect to the horizontal owing to inclination of the device to which the brake is applied, it is to be understood that the invention contemplates the use of two or more reservoirs on opposite sides of the brake and interconnected so that regardless of the inclination of the system the average head of liquid acting on the brake inlet will remain the same as if the system were fixed in one definite horizontal plane.

Figs. 6 and 7 illustrate this modification of the invention. As shown, two reservoirs 73 and 74 are provided, disposed symmetrically about the axis of the rotor, and carried by a supporting frame 72. The reservoirs are joined by conduit 75 having a branch 76 leading to inlet 31 of the rotor chamber, as shown. Outlet 32 of the rotor chamber is in communication with the top of the reservoirs through conduits 78 and 79. The floats 34 are operated by a linkage comprising links 35 and bell cranks 80 mounted on an axle 81, journaled as at 82 on a frame or other support 83, which conveniently is the frame of the automobile. Pedal 48 is mounted on an axle 85, journaled as at 86 on frame 83, and the axle is provided with arms 87 keyed thereto as at 88. The arms are pivotally attached to a pair of links 89 which operate the bell cranks. The pedal is normally held in a rearward position by a rod 51 and spring 55 bearing against lug 52 on the housing. An elevated liquid reservoir 90 is provided, joined, through an enclosed float valve control 91 similar to float valve control 61 (Fig. 4), with inlet 31. A stand pipe 92 in the closed float valve chamber 93 extends up to adjacent the upper level of the rotor. A conduit 94 connects the reservoir and the float valve control, and a pair of conduits 95 joins the float valve control with the reservoirs, as shown. If desired, the open float of Fig. 4 can be substituted for the arrangement shown. The operation of this modification is similar to that of the other devices described. The level of liquid in the rotor chamber is undisturbed by tilting of the reservoirs away from level.

My invention is not intended to eliminate the brakes ordinarily used for effecting a stop in devices to which it is applied, but it may be used to reduce the speed of the element to be braked before applying the positive braking mechanism. Such use offers many advantages. For example, with trucks and buses where the route covers a hilly district, it previously has been necessary to proceed downhill with the engine in low gear to prevent overheating and excessive wear on the mechanical friction brakes and to prevent excessive speed which the mechanical brakes cannot adequately control. When my invention is applied to such service it affords a drag of variable intensity so that hills can be negotiated by heavy vehicles at safe speeds and these speeds reduced when desired but complete stoppage of the vehicle will at all times be effected by the other brakes now existing. In addition the wear on the mechanical friction brakes will be very much reduced as they will only be used for final stopping or for emergency.

Other practical advantages of my device are:

In operation, quick control of resistance is afforded. When the direction of rotation of the rotor is reversed and it is desirable to have the brake offer no resistance to such rotation, the liquid may be drained from the brake casing without waste; and in addition, in cases of emergency the brake is made immediately available by the simple throw of a lever or like operation.

The operation of the brake depends in no way on an external source of water pressure.

The control element, comprising the reservoir and displacement body, may be conveniently placed at the station of the operator.

In high speed work the rotor may be instantly disengaged from the element to be braked, thus offering no resistance when the brake is not applied.

While the device here shown and claimed has been above described particularly in its application to brakes used in connection with drilling rigs and automobiles, it is to be understood that the invention is not limited to such application. For example, the modification described in connection with the application of my invention to automotive use may readily be adapted for use in high speed hoisting work where it is desirable to have no resistance to the hoisting operation.

What I claim is:—

1. A hydraulic brake comprising a rotor actuated by a rotary element to be braked, a stator fixed against rotation, said brake acting to circulate liquid through a reservoir, the liquid level in which determines the braking resistance developed by the brake, means for varying the level of liquid in the reservoir and a gradually engageable clutch acting between said rotor and said element and arranged to be engaged or disengaged irrespective of the direction of rotation of the rotary element to be braked.

2. A hydraulic brake comprising a rotor actuated by an element to be braked, a stator fixed against rotation, said brake acting to circulate liquid through a reservoir the liquid level in which may be varied between one at which no liquid circulates and one at which the maximum amount of liquid circulates at any given speed of said rotor to vary the braking resistance developed by the brake from minimum to maximum respectively, means for varying the level of liquid in the reservoir between the stated limits, a clutch acting between said rotor and said element and means for actuating said clutch and said level varying means, said actuating means being adapted to cause engagement of the clutch before causing variation of the level of liquid in the reservoir when applying the brake and disengagement of the clutch after causing variation when releasing the brake.

3. A hydraulic brake comprising a rotor actuated by an element to be braked, a stator fixed against rotation forming a liquid-holding chamber surrounding said rotor, liquid inlet to and liquid outlet from said chamber, a reservoir connected at the bottom to said inlet and at the top to said outlet, liquid in said reservoir at a level normally below the level of said inlet, said brake acting to circulate liquid through said reservoir, and the braking resistance developed by the brake increasing proportionally to an increase of liquid level in the reservoir over that of said inlet, displacement means to vary the level of liquid in said reservoir, a clutch acting between said rotor and said element and means for actuating said clutch and said level varying means, said actuating means being adapted to cause engagement of the clutch prior to causing the displacement means to raise the level of liquid in said reservoir when applying the brake and to reverse the order of actuation when releasing the brake.

4. A hydraulic brake comprising a rotor actuated by an element to be braked, a stator fixed against rotation and forming a liquid-holding chamber around said rotor, a liquid inlet at a low point in said chamber and a liquid outlet at a high point, a liquid reservoir connected at the bottom with said inlet and at the top with said outlet, liquid in said reservoir at a level normally below the level of said inlet, displacement means for raising or lowering the level of liquid in the reservoir, the braking resistance of said brake increasing with an increase of liquid level in said reservoir over said inlet level, a clutch between said rotor and said element, and means to actuate said clutch and said displacement means, said actuating means acting to engage the clutch prior to causing the displacement means to raise the liquid level in said reservoir when applying said brake and acting to cause the displacement means to lower the liquid level in said reservoir prior to disengaging the clutch when releasing the brake.

5. A hydraulic brake comprising a rotor actuated by an element to be braked, a stator forming a liquid-holding chamber around said rotor, an inlet to said chamber at a low point and an outlet at a high point, a liquid reservoir connected at the bottom with said inlet and at the top with said outlet, liquid in said reservoir normally at a level below said inlet level, a movable displacement body adapted to raise or lower the level of liquid in said reservoir and a clutch between said rotor and said element to be braked.

6. The brake of claim 5 wherein means are provided for engaging said clutch before moving said displacement body to raise the level of liquid in the reservoir when applying said brake and moving said displacement body to lower the level of liquid prior to disengaging the clutch when releasing said brake.

7. A hydraulic brake to be applied to a rotating element which is intermittently to be braked and to be permitted free and unrestricted rotation, comprising a rotor, a cooperating stator, a reservoir for braking liquid, the rotor and stator cooperating to circulate liquid through the reservoir, a gradually engageable and disengageable clutch acting between the rotor and the braked element and adapted in one position to lock the rotor with said element and in another position to disengage the rotor and said element, so as to stop the rotor and allow free movement of said element, and means for varying the level of liquid in the reservoir whereby the braking action of the brake may be varied.

8. A hydraulic brake adapted to be applied to a rotating element which is intermittently to be braked and permitted free and unrestricted rotation, comprising a rotor surrounding and coaxial with the rotating element, a cooperating stator fixed against rotation, a reservoir for braking liquid, the rotor and stator cooperating to circulate liquid through the reservoir, a gradually engageable and disengageable clutch acting between the rotor and the braked element and adapted in one position to lock the rotor with respect to said element and in another position to disengage the rotor from said element so as to stop the rotor and allow free movement of said element, means for normally keeping the clutch disengaged and means for engaging the clutch when desired, and means for varying the level of liquid in the reservoir whereby the braking action of the brake in engaged clutch position may be varied.

9. A hydraulic brake for automobiles and adapted to be applied to a rotating element which is intermittently to be braked and to be permitted free and unrestricted rotation, comprising a rotor, a cooperating stator fixed against rotation, a reservoir for braking liquid, the rotor and stator cooperating to circulate liquid through the reservoir, a gradually engageable and disengageable clutch acting between the rotor and the braked element, and adapted in one position to lock the rotor with said element and in another position to disengage the rotor so as to stop it and allow free movement of said element, pedal means for disengaging the clutch, and means for varying the level of liquid in the reservoir whereby the braking action of the brake in engaged clutch position may be varied.

10. A hydraulic brake adapted to be applied to a rotating element which is intermittently to be braked and to be permitted free and unrestricted rotation, the brake being further adapted to operate efficiently even when the parts thereof are off level, the brake comprising a rotor, a cooperating stator, a pair of reservoirs for braking liquid disposed symmetrically about the axis of the rotor, the rotor and stator cooperating to circulate liquid through the reservoirs, a gradually engageable and disengageable clutch acting between the rotor and the braked element and adapted in one position to lock the rotor with said element and in another position to disengage the rotor and said element so as to disengage the rotor and said element and means allow free movement of said element and means for varying the level of liquid in the reservoirs, whereby the braking action of the brake may be varied.

ABBOTT A. LANE.